United States Patent [19]

Kurtzahn et al.

[11] Patent Number: 5,265,766
[45] Date of Patent: Nov. 30, 1993

[54] APPARATUS FOR RECEIVING AND DISPENSING LIQUIDS

[75] Inventors: Frithjof Kurtzahn, Weyhe-Leeste; Lutz Thime, Delmenhorst, both of Fed. Rep. of Germany

[73] Assignee: Jacobs Suchard AG, Zurich, Switzerland

[21] Appl. No.: 38,613

[22] Filed: Mar. 29, 1993

Related U.S. Application Data

[63] Continuation of Ser. No. 788,346, Nov. 6, 1991, abandoned.

[30] Foreign Application Priority Data

Nov. 9, 1990 [DE] Fed. Rep. of Germany ....... 4035724

[51] Int. Cl.⁵ .............................................. B65D 35/56
[52] U.S. Cl. ................................ 222/105; 222/131; 222/481.5; 141/18
[58] Field of Search ............... 222/105, 131, 185, 214, 222/325, 481, 481.5, 504, 529; 141/18, 21, 309, 285, 10

[56] References Cited

U.S. PATENT DOCUMENTS

| | | | |
|---|---|---|---|
| 3,145,515 | 8/1964 | Clapsadle . | |
| 3,225,954 | 12/1965 | Herrick et al. . | |
| 3,587,934 | 6/1971 | Elmore | 222/529 X |
| 3,945,534 | 3/1971 | Ady | 222/131 X |
| 3,976,277 | 8/1976 | Basel et al. | 222/529 X |
| 4,361,257 | 11/1982 | Stone, Jr. | 222/481 X |
| 4,375,864 | 3/1983 | Savage | 222/105 X |
| 4,506,812 | 3/1985 | DeFreitas . | |
| 4,629,098 | 12/1986 | Eger | 222/529 X |
| 4,662,521 | 5/1987 | Moretti . | |
| 4,785,974 | 11/1988 | Rudick et al. | 222/105 |
| 4,869,402 | 9/1989 | Ash, Jr. | 222/131 X |

FOREIGN PATENT DOCUMENTS

| | | |
|---|---|---|
| 1719727 | 12/1955 | Fed. Rep. of Germany . |
| 3433354 | 3/1986 | Fed. Rep. of Germany . |
| 8908270 | 6/1989 | Fed. Rep. of Germany . |
| 8909888 | 8/1989 | Fed. Rep. of Germany . |
| 9010151 | 10/1990 | Fed. Rep. of Germany . |
| 276989 | 8/1951 | Switzerland . |
| 322514 | 7/1957 | Switzerland . |
| 2033573 | 5/1980 | United Kingdom . |

*Primary Examiner*—Gregory L. Huson
*Attorney, Agent, or Firm*—Burns, Doane, Swecker & Mathis

[57] ABSTRACT

An insulating container (10) is used for storing and dispensing (hot) liquids, especially freshly brewed coffee beverages. Within this insulating container (10), there is arranged a bag-like inner container (11) made of a flexible material which is thus flatly collapsible. The liquid is filled into the inner container (11), so that the latter completely fills out the inner space of the insulating container (10). A tube piece (22) is attached to the inner container (11) and is passed through a channel (24) in the insulating container (10) to the outside. A filler pipe (26) for filling the inner container (11) or alternatively a tap (28) for dispensing the beverage can be connected to the end of the tube piece (22) which is located on the outside.

3 Claims, 5 Drawing Sheets

APPARATUS FOR RECEIVING AND DISPENSING LIQUIDS

This application is a continuation of application Ser. No. 07/788,346, filed Nov. 6, 1991 and now abandoned.

FIELD OF THE INVENTION

The invention relates to an apparatus for receiving and dispensing hot or cold liquids, especially beverages, with a thermally insulating container (insulating container) which has at least one opening closable by a lid.

BACKGROUND OF THE INVENTION

Insulating containers for thermally insulating of beverages, especially coffee beverages, are already known. These insulating containers consist of an outer wall made of metal and an inner wall, usually made of glass. An upper filler opening is closed by a lid which is also thermally insulating. There may be a dispenser valve in the lower portion for dispensing the liquid.

Such insulating containers are quite suitable for storing hot beverages over a relatively long period, but it has been found that aroma-sensitive beverages, especially coffee beverages, suffer a loss of aroma after a short period. Coffee beverages lack the typical aroma of freshly brewed coffee.

SUMMARY OF THE INVENTION

The invention is based on the object of improving the storage of aroma-sensitive beverages, especially of freshly brewed coffee beverages, such that these beverages do not suffer any noticeable loss of aroma even after a relatively long period.

To attain this object, the apparatus according to the invention is characterized in that within the insulating container there is arranged a bag-like gas-tight inner container, made of a flexible and flatly collapsible material, which serves for receiving the liquid and has at least one tube line or a tube connection for dispensing the liquid.

Although the insulating container is naturally suitable and meant for directly receiving hot beverages, the findings of the invention show that it is surprisingly expedient for the preservation of the aroma of the hot beverage to store it within the insulating container in an inner container made of a gas-tight and liquid-tight collapsible film. The hot beverage is filled into the inner container located within the insulating container, preferably in such a way that the inner space of the insulating container is completely filled out by the filled inner container. The inner container should also be completely filled without any air being trapped.

The invention is based on the finding that the admission of oxygen to the hot beverage, especially to a coffee beverage, causes the undesired loss of aroma. By providing the collapsible inner container made of thin gas-tight film, that even while portions of the coffee beverage are dispensed, the coffee left in the container always remains sealed against any admission of air or oxygen, because the inner container reduces the free volume by collapsing or pressing together the container walls in response to the dispensation of hot beverages. Air only enters the insulating container in accordance with the reduction of the liquid level in the insulating container. Consequently, the aroma and the temperature of the hot beverage are preserved over a long period.

When the apparatus as taught by the invention is used, the (empty and desired, i.e. flatly collapsed) inner container is inserted into the insulating container while the lid is removed. A tube line attached to the inner container is passed to the outside through an orifice or channel. Alternatively, a tube connection attached to the inner container can be directly connected via a coupling to the inside of a passage located in the lid or in a different portion of the insulating container.

The apparatus is preferably designed such that the insulating container or parts thereof do not come into contact with the beverage. For this purpose, a tube line is attached to the inner container. This tube line is passed to the outside through an orifice or channel in the insulating container. The necessary fittings for, on the one hand, filling the inner container and, on the other hand, dispensing the beverage, can be releasably attached to the portion or end of the tube line which is located on the outside. After the inner container has been emptied, it is removed, together with the tube line, from the insulating container and is replaced by a new inner container.

BRIEF DESCRIPTION OF THE DRAWING FIGURES

Exemplary embodiments of the invention will be described below in detail with reference to the drawings, in which:

FIG. 1 shows an exemplary embodiment of the apparatus with a vertical section of an insulating container, FIG. 2 shows another exemplary embodiment of the apparatus when it is empty, FIG. 3 shows the apparatus in a filled state after the process of filling has finished, FIG. 4 shows the apparatus of FIG. 2 and FIG. 3 while it is emptied by means of a dispensation of a liquid, FIG. 5 is a vertical section of a further exemplary embodiment of the apparatus.

DETAILED DESCRIPTION OF THE PREFERRED EMBODIMENTS

Figure 1:
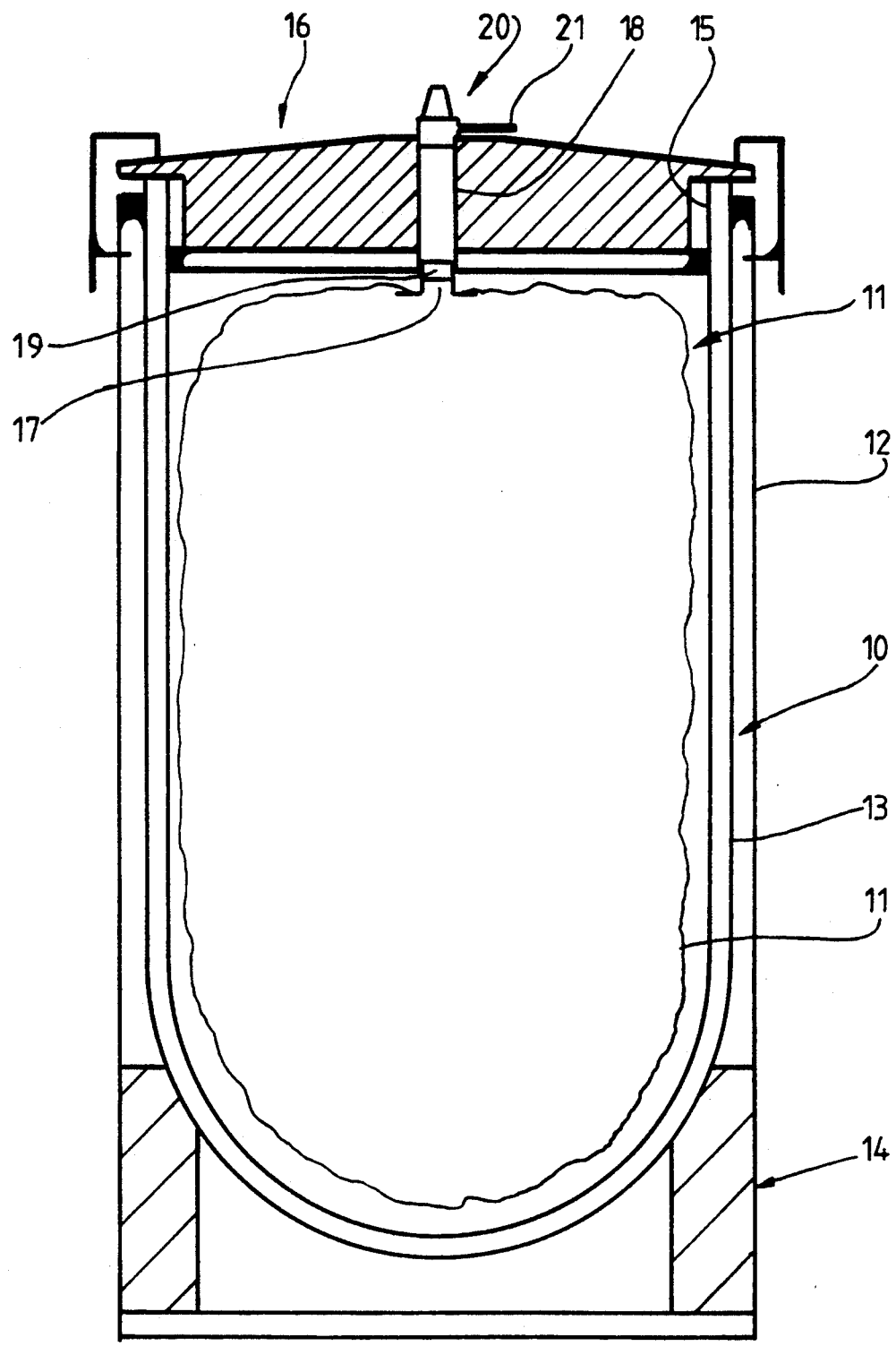

The exemplary embodiments illustrated in the drawings relate to containers for storing and dispensing especially freshly brewed hot coffee beverages. Each container unit consists of an outer container, specifically an insulating container 10 and an inner container 11 arranged therein.

In principle, the insulating container 10 is designed in a customary manner. Within an outer wall 12 made of a solid and durable material, especially steel or plastic, there is arranged an insulating insert 13 which is preferably made of glass and has double walls. A bottom of the insulating insert 13 has a curved or spherical cross-section and rests in a bottom piece 14 of the insulating container 13 having a plane lower base. At the top side, the insulating container 10, including the insulating insert 13, is open and forms a container opening 15 which extends over the whole inner cross-section. A lid 16 sets in this opening. This lid 16 is also designed to be thermally insulating and is fixed by closing means, for example with a thread or other conventional sealing closing means.

Figure 2:
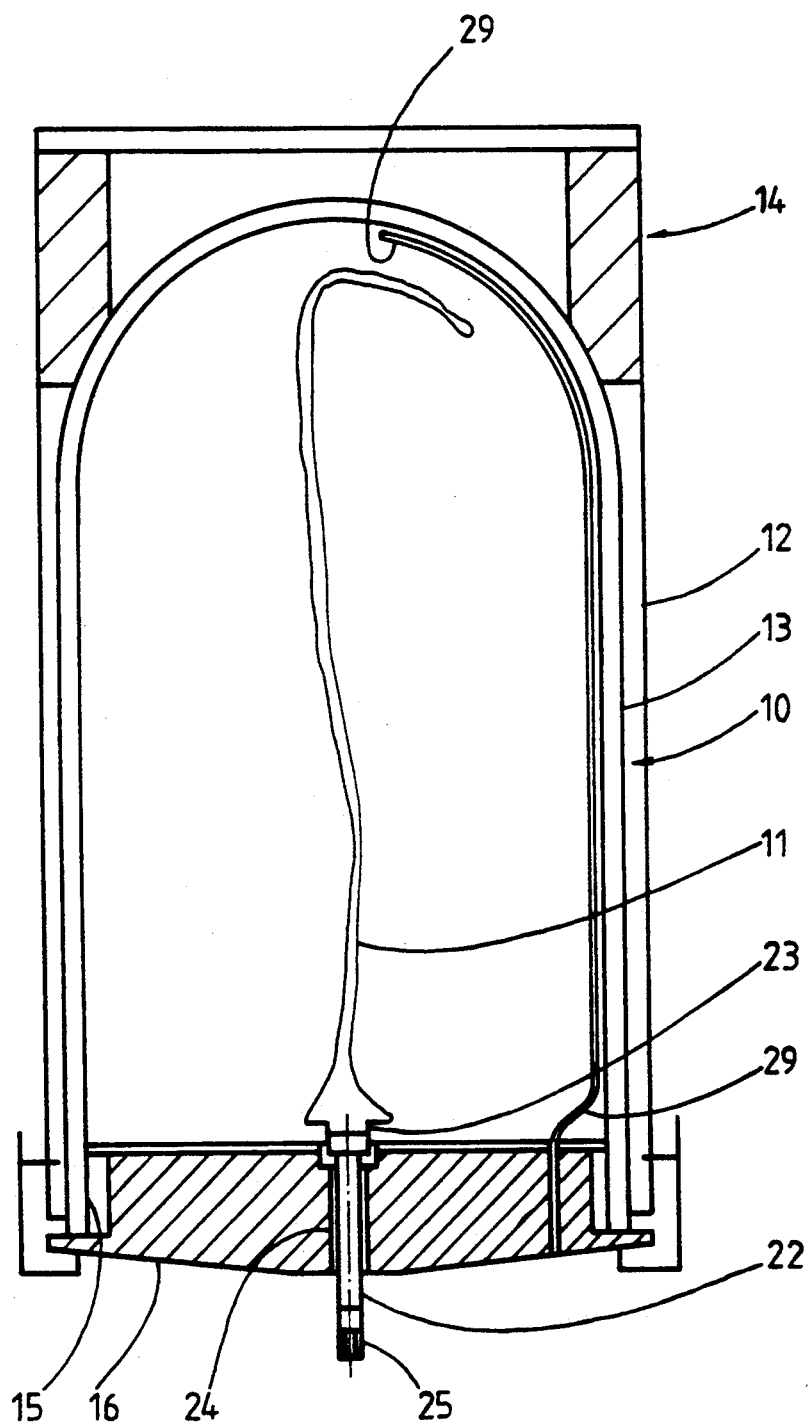

The liquid or the (hot) beverage is filled into the inner container 11 which consists of an air-tight and gas-tight —and of course liquid-tight—film, especially a laminate with a metal layer. The inner container 11 is flexible and flatly collapsible when empty, such that the walls of the inner container 11 contact one another without trapping air (FIG. 2). When filled (FIG. 1, FIG. 3 and FIG. 5), the inner container 11 is completely filled by the liquid, i.e. without any air being trapped. There is no air present even if the container is only partially filled, as for example illustrated in FIG. 4.

The inner container 11 is provided with at least one tube-like or pipe-like connection for filling in and dispensing the liquid. In the exemplary embodiment of FIG. 1, a relatively short tube connection 17 of the inner container 11 is directly connected with a liquid passage 18 in a wall of the insulating container 10, and in the present case in the lid 16 of the insulating container 10. For this purpose, the tube connection 17 is provided with a coupling 19 which is connected to the inner side or the inside port of the liquid passage 18.

On the outer side, the liquid passage 18 is provided with a valve 20 which is designed such that, on the one hand, it can be connected to an appropriate counter valve of an apparatus for preparing liquids, especially of a coffee brewing machine and, on the other hand, the valve 20 is also suitable for dispensing liquids in portions from the inner container 11. For this purpose, an actuating handle 21 is attached to the valve 20. When liquids are dispensed, the whole insulating container 10 is turned by 180°, so that the valve 20 is directed downwards. Air can enter or escape from the insulating insert 13 via a channel (not shown in detail) in the region of the liquid passage 18. As a result, the free inner space of the insulating insert 13 which is not filled by the inner container 11 is not under pressure or negative pressure.

The exemplary embodiments of FIG. 2 to FIG. 5 are more advantageous.

Figure 3:
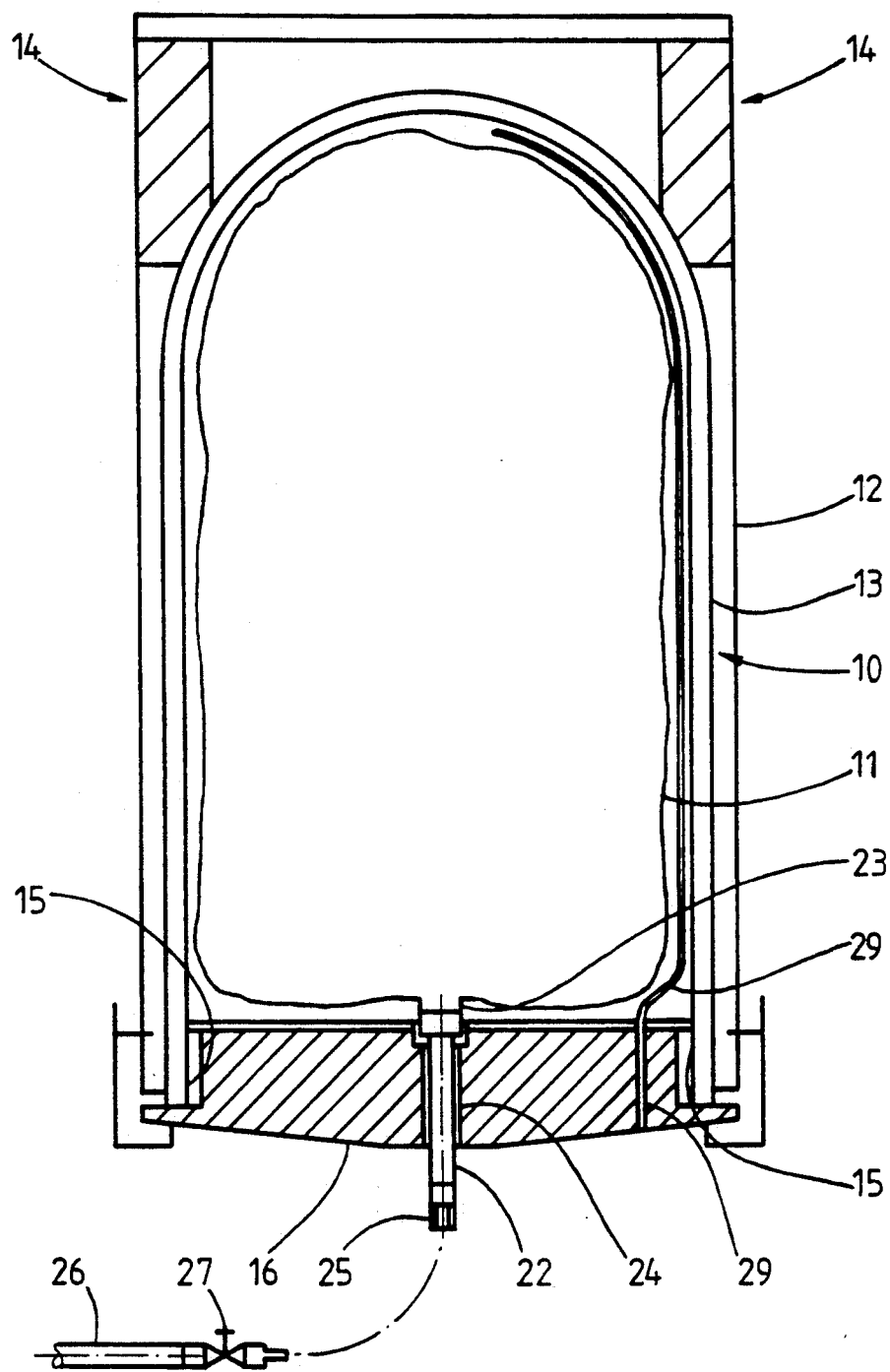
Figure 4:
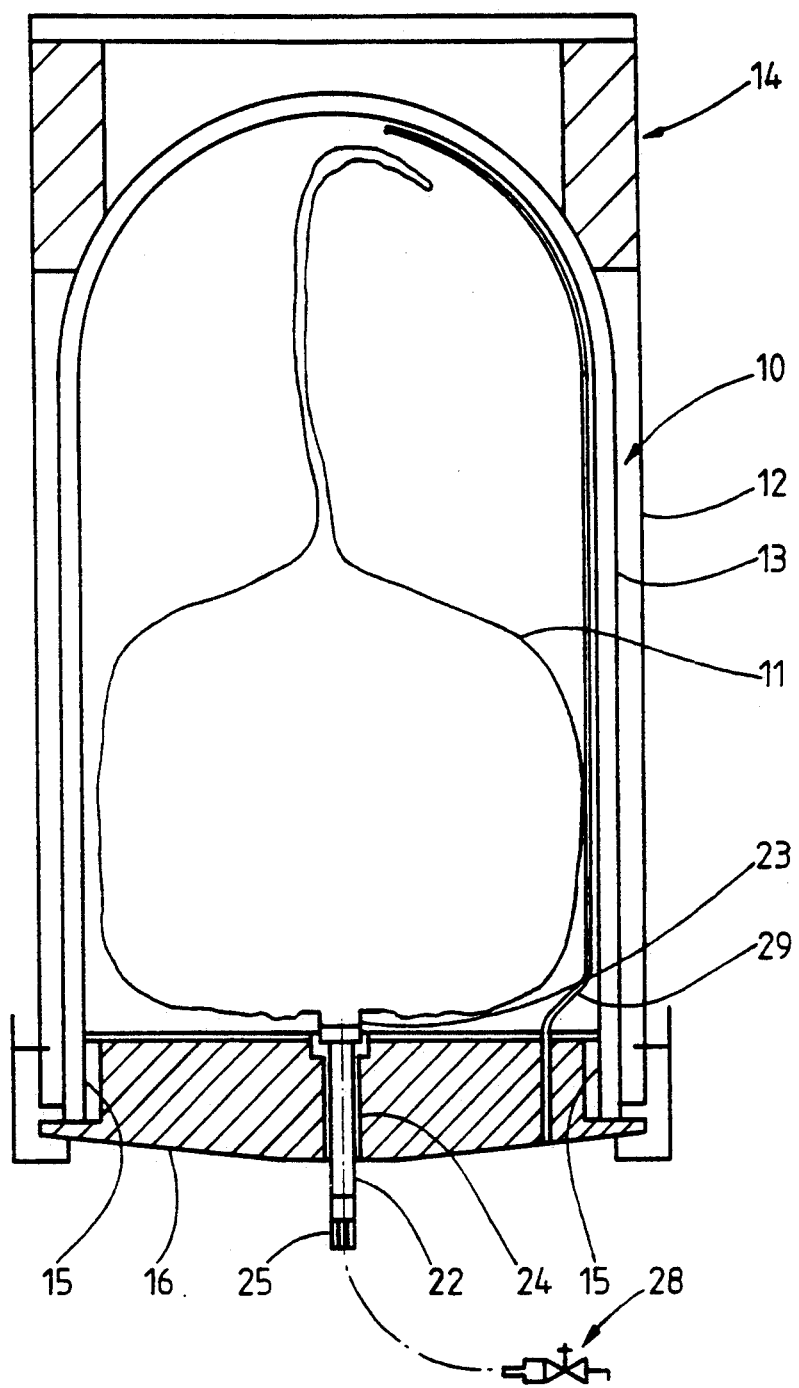
Figure 5:
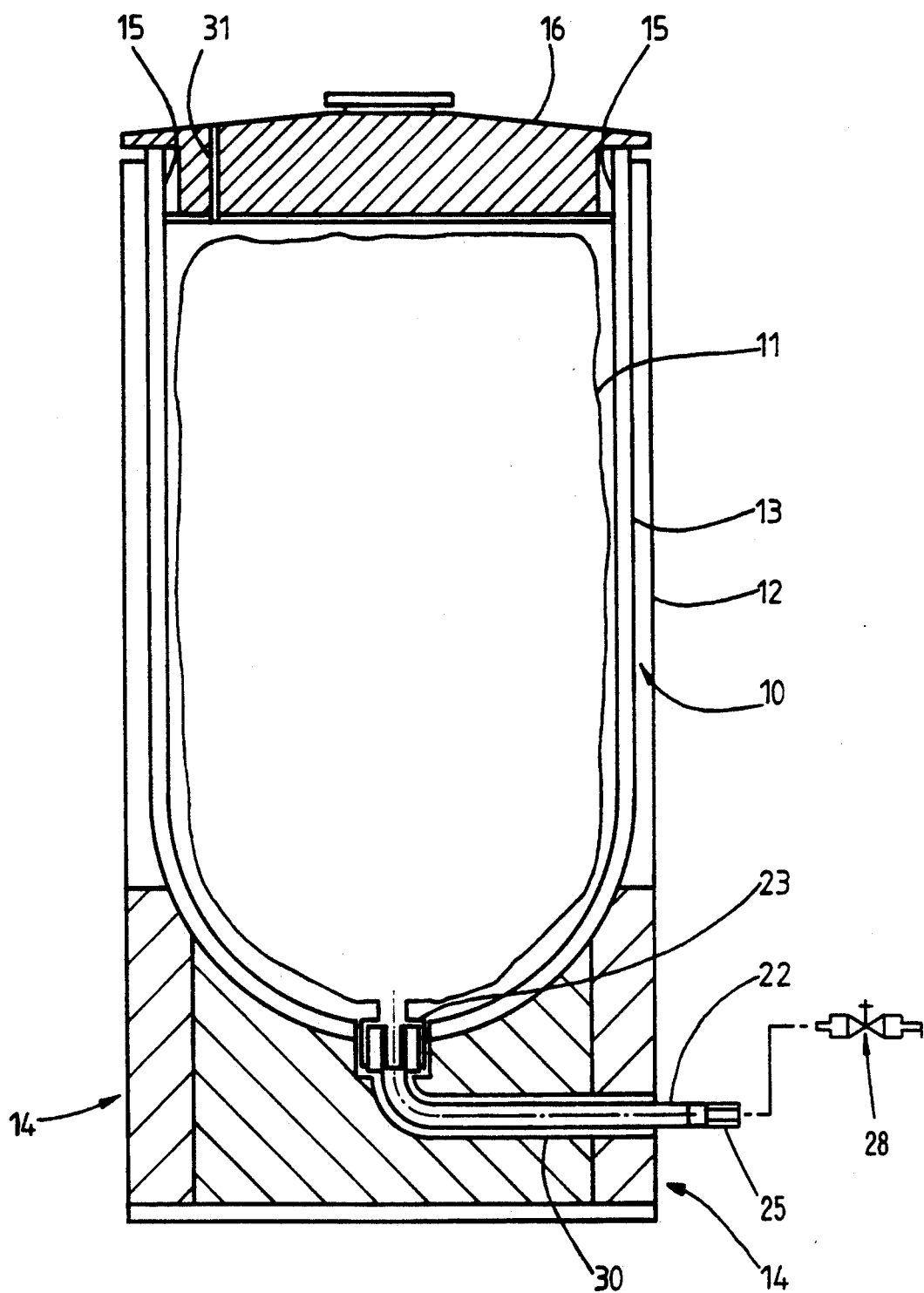

In the embodiment of FIG. 2 to FIG. 4, a sufficiently dimensioned tube piece 22 or pipe piece is connected with the inner container 11. The tube piece 22 can be either tightly or releasably attached to the inner container 11. FIG. 5 shows details of a coupling for connecting the tube piece 22 with a connecting piece 23 of the inner container 11. This connection is a sealing plug or slide connection capable of bearing mechanical loads.

In the embodiment of FIG. 2 to FIG. 4, the tube piece 22 passes through a channel 24 located in a part or a wall of the insulating container 10. In this embodiment, a rectilinear channel 24 is centrally arranged in the lid 16. The dimensions of this channel 24 are defined such that the tube piece 22 can be pushed through the channel 24. At the same time, the insulating effect of the lid 16 must not be impeded.

The length of the tube piece 22 is defined such that a sufficient end piece projects from the lid 16 on the outside. A valve coupling 25 is attached to the free end of the tube piece 22. This valve coupling 25 is provided with an automatic closing means (not shown) on the inside. The closing means, especially a nonreturn valve or flap, ensures a tight closure of the inner container 11.

To put the inner container 11 into use, a filler pipe 26 (or tube) is connected to the end of the tube piece 22 in a filling station, for example in a brewing machine. At the end which is to be connected, the filler pipe 26 is provided with a shutting means 27 or a valve. A plug coupling on the filler pipe 26 or on the shutting means 27 ensures that when the valve coupling 25 of the tube piece 22 is connected, the closing means (nonreturn valve) is opened and the passage in the tube piece 22 is left free. When the shutting means 27 is opened, the liquid can be led or pumped via the filler pipe 26 into the inner container 11 until this inner container 11 is completely filled and thus completely fills out the inner space of the insulating insert 13.

After the inner container 11 has been filled, the filler pipe 26 is pulled off the tube piece 22. The closing means in the region of the valve coupling 25 again takes effect and closes the inner container 11 which can now be transported and put in an appropriate place, specifically with the lid 16 pointing downwards (FIG. 4). In the shown exemplary embodiment, however, the lid 16 also points downwards while it is filled (FIG. 3).

To dispense portions of the beverage in the inner container 11, an emptying means, specifically a tap 28, is connected to the tube piece 22 or the valve coupling 25. In this process, the closing means in the valve coupling 25 is opened in the previously described manner, so that a connection is made with the tap 28. When the tap 28 is operated, the liquid can be discharged from the inner container 11.

The inner container 11 is again flatly collapsed in the liquid-free region in response to the discharge of liquid (FIG. 4). As a result, a free space is formed above the inner container 11 in the insulating insert 13. This space is filled with air. For this purpose, an air pipe 29 leads through the lid 16 to the outside. The air pipe 29 extends within the insulating container 10 or insulating insert 13 up to its top region (bottom of the insulating insert 13).

The apparatus of FIG. 2 to FIG. 4 is handled such that, with the lid 16 being directed upwards, the lid 16 is removed from the insulating container 10 and the inner container 11 is placed inside the insulating container 10. In this process, the tube piece 22 of the inner container 11 is passed through the channel 24 and is fixed. Thereafter, the lid 16 is sealably placed onto the insulating container 10. Now, the container is turned by 180° and is filled with liquid from below. After being filled, the container unit can be used in any place in the above described way for dispensing beverage portions. When the container has been emptied and the tap 28 has been pulled off, first the lid 16 is removed and then the empty inner container 11 is disposed. This inner container 11 is designed for a single use only but it would also be possible to reuse the inner container 11 after an appropriate cleaning.

In the exemplary embodiment of FIG. 5, a channel 30 for the passage of the tube piece 22 attached to the inner container 11 is arranged in the lower region of the insulating container 10, and in this case in the bottom piece 14. The channel 30 extends under curved deflection from the middle of the insulating container or the insulating insert 13 to a side of the container. The flexible tube piece 22 is thereby deflected. A tap 28 is attached to the tube piece 22 on the outside in the previously described manner.

In this exemplary embodiment, an air pipe 31 for airing and desiring the inner space is arranged in the lid 16 in the form of a channel having a thin cross-section. When the insulating container 10 is filled and emptied, it is held in the normal position, i.e. with the lid pointing upwards.

We claim:

1. An apparatus for receiving and dispensing hot or cold liquids, comprising: a thermally insulating container having a top, the top of said insulating container having an opening provided therein and a lid mountable on the top to close the opening, said insulating container having an inner space; a gas-tight inner container positioned in the insulating container, said inner container being made of a flexible material that is collapsible into a flat state and which, in an empty and vacuous state, is introducible into the insulating container and which can be filled while being located in the insulating container, said inner container filling up substantially the entire inner space of the insulating container when the inner container is filled with liquid, said inner container including a connecting piece; an air pipe for venting the inner space of the insulating container, said air pipe extending from the inner space of the insulating container through the lid and opening to outside the apparatus; a flexible tube connected to the connecting piece of the inner container, said flexible tube extending through a channel formed in a side wall of the said insulating container and opening to outside the apparatus; a valve coupling operatively associated with said flexible tube, said valve coupling including automatic closing means for automatically closing access to and from the inner container through the tube, said tube being connectable to filler means for filling the inner container with liquid, said automatic closing means being openable to allow liquid to flow into the inner container when the filler means is connected to the tube and being automatically closed to prevent liquid from being dispensed from the inner container when the filler means is disconnected from the tube, said tube also being connectable to a tap for dispensing liquid from the inner container, said automatic closing means being openable to allow liquid to flow from the inner container when the tap is connected to the tube and being automatically closed to prevent liquid from being dispensed from the inner container when the tap is disconnected from the tube.

2. The apparatus as claimed in claim 1, wherein the connecting piece is disposed in a lower portion of the inner container and is releasably connected to the valve coupling by way of the tube.

3. The apparatus as claimed in claim 1, wherein said flexible tube also extends through a bottom piece which forms a part of the insulating container, the lid being positioned at the end of the insulating container opposite the bottom piece.

* * * * *